US008132506B2

(12) United States Patent
Ichikawa et al.

(10) Patent No.: US 8,132,506 B2
(45) Date of Patent: Mar. 13, 2012

(54) MEDIA PROCESSING DEVICE AND CONTROL METHOD FOR A MEDIA PROCESSING DEVICE

(75) Inventors: Mahito Ichikawa, Matsumoto (JP); Kazuya Toshima, Ueda (JP); Keisuke Tsunoda, Toumi (JP)

(73) Assignee: Seiko Epson Corporation, Tokyo (JP)

( * ) Notice: Subject to any disclaimer, the term of this patent is extended or adjusted under 35 U.S.C. 154(b) by 693 days.

(21) Appl. No.: 11/906,740

(22) Filed: Oct. 3, 2007

(65) Prior Publication Data

US 2008/0105142 A1 May 8, 2008

(30) Foreign Application Priority Data

Oct. 3, 2006 (JP) ................................. 2006-271485
Oct. 5, 2006 (JP) ................................. 2006-273903

(51) Int. Cl.
*B41F 17/00* (2006.01)
(52) U.S. Cl. .............. 101/35; 101/43; 101/44; 101/484; 101/486
(58) Field of Classification Search ................ 101/4, 35, 101/486
See application file for complete search history.

(56) References Cited

U.S. PATENT DOCUMENTS

| 5,873,692 | A | * | 2/1999 | Costas | 414/796.9 |
| 6,141,298 | A | * | 10/2000 | Miller | 369/30.33 |
| 6,400,659 | B1 | | 6/2002 | Kitaoka | |
| 6,532,198 | B1 | | 3/2003 | Miller | |
| 7,090,131 | B2 | | 8/2006 | Natsuno | |
| 2002/0168205 | A1 | | 11/2002 | Suden | |
| 2005/0157605 | A1 | | 7/2005 | Lilland | |
| 2006/0231621 | A1 | | 10/2006 | Natsuno | |
| 2007/0268790 | A1 | | 11/2007 | Arai | |
| 2007/0280057 | A1 | | 12/2007 | Ikeda | |
| 2008/0104305 | A1 | | 5/2008 | Ichikawa | |

FOREIGN PATENT DOCUMENTS

| EP | 0 918 324 | | 5/1999 |
| JP | 05-258444 | A | 10/1993 |
| JP | 05-266048 | | 10/1993 |
| JP | 09-115229 | A | 5/1997 |
| JP | 11-353762 | A | 12/1999 |
| JP | 2000-195148 | A | 7/2000 |
| JP | 2000-260172 | | 9/2000 |
| JP | 2002-056584 | | 2/2002 |
| JP | 2002056584 | | 2/2002 |
| JP | 2002-334552 | | 11/2002 |
| JP | 2002334552 | | 11/2002 |
| JP | 2004-273048 | | 9/2004 |
| JP | 2004273048 | | 9/2004 |
| JP | 2005-229514 | | 8/2005 |
| JP | 2005-259230 | A | 9/2005 |

OTHER PUBLICATIONS

European Search Report (Dec. 3, 2008).

* cited by examiner

*Primary Examiner* — Matthew G Marini
(74) *Attorney, Agent, or Firm* — Nutter McClennen & Fish LLP; John J. Penny, Jr.; Christina M. Sperry

(57) ABSTRACT

A control method for a publisher that has a media drive for writing data to one side of a target disc, a label printer for printing on the other side of the target disc, media stacker for storing the target discs, and a media transportation mechanism for transporting the target disc at least any one of the media drive, the label printer, and the media stacker in response to a command from a host computer reports an error to a host computer when the target disc cannot be transported as instructed by the host computer.

18 Claims, 11 Drawing Sheets

| STARTING POINT | POSITION AFTER MOVING FROM STARTING POINT | | | | | | | | |
|---|---|---|---|---|---|---|---|---|---|
| | [1] | [2] | [3] | [4] | [5] | [6] | [7] | [8] | [9] |
| HOME POSITION (STANDBY POSITION) | [1] | [1] | [1] | [1] | [1] | [1] | - | - | - |
| MIDPOINT | [4] | [4] | [4] | [4] | [4] | [4] | - | - | - |
| BLANK MEDIA STACKER 11 | [2] | [2] | [2] | [2] | [2] | [2] | - | - | - |
| PROCESSED MEDIA STACKER 12 | [5] | [5] | [5] | [5] | [5] | [5] | - | - | - |
| GENERAL PURPOSE STACKER 13 | [1] | [1] | [1] | [4] | [4] | [4] | - | - | - |
| DISCHARGE MEDIA STACKER 14 | [1] | [1] | [1] | [4] | [4] | [4] | - | - | - |
| MEDIA DRIVE 4 | [1] | [1] | [1] | [1] | [1] | [1] | - | - | - |
| PRINTER TRAY 81 | [1] | [1] | [1] | [4] | [4] | [4] | - | - | - |
| | | | | | | | | | |
| | | | | | | | | | |

FIG. 5

| COMMAND PARAMETER | POSITION AFTER MOVING FROM STARTING POINT | | | | | | | | |
|---|---|---|---|---|---|---|---|---|---|
| | [1] | [2] | [3] | [4] | [5] | [6] | [7] | [8] | [9] |
| HOME POSITION (STANDBY POSITION) | [1] | [1] | - | [1] | [1] | - | - | - | - |
| MIDPOINT | [4] | [4] | - | [4] | [4] | - | - | - | - |
| LOCATION OF FIRST MEDIA STACKER 121 | [2] | [2] | - | [2] | [2] | - | - | - | - |
| LOCATION OF SECOND MEDIA STACKER 122 | [5] | [5] | - | [5] | [5] | - | - | - | - |
| LOCATION OF SLIDING TRAY 170 | [1] | [1] | - | [4] | [4] | - | - | - | - |
| LOCATION OF THIRD MEDIA STACKER 172 | [1] | [1] | - | [4] | [4] | - | - | - | - |
| LOCATION OF TOP MEDIA DRIVE 141 | [1] | [1] | - | [1] | [1] | - | - | - | - |
| LOCATION OF BOTTOM MEDIA DRIVE 141 | [1] | [1] | - | [1] | [1] | - | - | - | - |
| LOCATION OF LABEL PRINTER 111 | [1] | [1] | - | [4] | [4] | - | - | - | - |

FIG. 11

MEDIA PROCESSING DEVICE AND CONTROL METHOD FOR A MEDIA PROCESSING DEVICE

Priority is claimed under 35 U.S.C. §119 to Japanese Patent Application Nos. 2006-271485 filed on Oct. 3, 2006 and 2006-273903 filed on Oct. 5, 2006, which are hereby incorporated by reference in their entirety.

TECHNICAL FIELD

The present invention relates to a media processing device that writes data to media such as CD and DVD discs, and prints on a label side of the media.

BACKGROUND TECHNOLOGY

Media processing devices that write data to media such as CD and DVD discs and print on the label side of the media are known from the literature. The media processing device has a transportation mechanism for carrying media to different processing stations inside the device. The transportation mechanism carries blank media stored in a blank media stacker to an internal media drive, and after writing data, carries the processed media to a processed media stacker. After writing data, the media are also carried to an internal label printer, and after label printing the processed media are transported to the processed media stacker or the media exit. See, for example, Japanese Unexamined Patent Appl. Pub. JP-A-2000-260172 and Japanese Unexamined Patent Appl. Pub. JP-A-2002-056584.

Japanese Unexamined Patent Appl. Pub. JP-A-2002-334552 teaches a transportation mechanism that has a picker for holding the media. The blank media stacker and the processed media stacker hold the media stacked in the thickness direction. The picker picks up the disc on the top of each stack and holds the disc as the transportation mechanism moves the disc to the media drive and the printer. After data writing is completed, the picker again picks up the disc and sequentially stacks the processed media on the processed media stacker.

Japanese Unexamined Patent Appl. Pub. JP-A-2004-273048 teaches a media processing device that has tray unit on which plural disc stackers are disposed, and a rotor for rotating the tray unit on the bottom of the device case. When the tray unit turns and stops with a stacker directly below the disc clamping unit, the clamping head of the disc clamping unit descends. The disc clamping unit then clamps the media and ascends, and the disc tray of the processing unit is unloaded. When the clamping head releases the clamped medium onto the disc tray and ascends, the disc tray is loaded and the recording process of the processing unit starts.

A problem with the media processing devices described above is that if a problem occurs during a media transportation operation and the transportation process is not completed normally, the media processing device will execute the next process as commanded because there is no way for recognizing that such a problem has occurred. This can result in such unexpected problems as media not being stored in the intended stacker and being dropped outside the stacker. If left uncorrected, this can result in damage to the media processing device.

SUMMARY OF THE INVENTION

The present invention is directed to solving this problem, and an object of the invention is to prevent events that may lead to damage to the media processing device if media being processed cannot be conveyed to any one of the data writing device, the printer, and the media stacker in response to a command from the host computer.

A first aspect of at least one embodiment of the invention is a media processing device that has a data writing device that applies a data writing process to one side of a target medium; a printer that applies a printing process to the other side of the target medium; a media stacker that stores the target medium; and a transportation device that transports the target medium to any one of the data writing device, the printer, and the media stacker according to a command from a host computer. The transportation device reports an error to the host computer when the target medium cannot be transported according to the command from the host computer.

Another aspect of at least one embodiment of the invention is a control method for a media processing device that has a data writing device that applies a data writing process to one side of a target medium, a printer that applies a printing process to the other side of the target medium, a media stacker that stores the target medium, and a transportation device that transports the target medium to any one of the data writing device, the printer, and the media stacker according to a command from a host computer. The control method has a step of reporting an error to the host computer when the target medium cannot be transported according to the command from the host computer.

When the target medium cannot be transported as instructed by the host computer, this aspect of at least one embodiment of the invention reports an error to the host computer and the host computer can therefore know that there is a problem with the media processing device. Issuing a next command can therefore be prevented. The media processing device can therefore be used safely, and the danger of causing damage can be reduced.

Preferably, the media processing device also has a position detector that detects the position of the transportation device, and a memory that stores the position where the position detector detected the transportation device as a starting point. The transportation device does not execute the received command if the starting point is not stored in the memory when the command is received from the host computer.

In another aspect of at least one embodiment of the invention, if a position detected by a position detector that detects the position of the transportation device is not stored as a starting point by a memory when a command is received from the host computer, the media processing device control method of the invention does not execute the received command.

With these aspects of the invention, a command received from the host computer is not executed if the starting point is not stored in the memory when the command is received from the host computer. Where the transportation device is positioned is not known if the starting point is not stored. The distance to travel from the starting point to the destination therefore cannot, be calculated even if a command specifying the destination has been sent. The media processing device can therefore be prevented from executing unexpected operations by not executing the command when a command is received from the host computer.

In the media processing device according to another aspect of at least one embodiment of the invention the transportation device does not execute the received command if the transportation device is positioned at a point outside the path of travel when the command is received from the host computer.

The control method for a media processing device according to another aspect of at least one embodiment of the invention does not execute the received command if the transportation device is positioned at a point outside the path of travel when a command is received from the host computer.

With these aspects of the invention the received command is not executed if the transportation device is not on the normal path of movement. Damage to the transportation device can therefore be prevented. The likelihood of the media processing device being damaged can also be reduced.

Further preferably, the transportation device of the media processing device according to at least one embodiment of the present invention has a gripper for picking up the target medium or releasing a picked-up target medium; and the transportation device determines if driving the gripper can be normally controlled when a pick-up command or a release command is received from the host computer, and reports an error to the host computer without executing the pick-up command or the release command if normal drive control is determined not possible.

In the control method for a media processing device according to another aspect of at least one embodiment of the invention, the transportation device has a gripper for picking up the target medium or releasing a picked-up target medium, and the control method determines if driving the gripper can be normally controlled when a pick-up command or a release command is received from the host computer, and reports an error to the host computer without executing the pick-up command or the release command if normal drive control is determined not possible.

This aspect of the invention executes the pick-up command or release command only after determining that the gripper can be driven and operated normally. The gripper can therefore be prevented from operating abnormally. The user can also know when a pick-up command or release command is not executed as expected because an error report is sent to the host computer when a pick-up command or release command is not executed.

Furthermore, if the gripper is already operating in response to another command, the gripper is determined to not be controllable according to the received command. For example, if the gripper is executing a previously applied pick-up command when another pick-up command is received, or the transportation device is moving in response to a previous movement command applied to the transportation device, an error report is sent to the host computer without driving the gripper. The safety of the media processing device can thus be assured by not driving the gripper when another operation is executing.

In a media processing device according to another aspect of the invention the transportation device determines if the gripper has picked up a target medium when a pick-up command is received, and does not execute the pick-up command if a target medium has already been picked up.

The control method for a media processing device according to another aspect of at least one embodiment of the invention determines if the gripper has picked up a target medium when a pick-up command is received, and does not execute the pick-up command if a target medium has already been picked up.

With these aspects of the invention the pick-up command is not executed if the gripper has already picked up a target disc when a pick-up command is received. This prevents the gripper from executing the picking up operation while still holding a previously picked-up disc. More specifically, dropping a picked-up disc in an unintended location can be prevented.

In a media processing device according to another aspect of at least one embodiment of the invention the transportation device determines if the gripper has picked up a target medium when a release command is received, and does not execute the release command if a target medium has not been picked up.

The control method for a media processing device according to another aspect of at least one embodiment of the invention determines if the gripper has picked up a target medium when a release command is received, and does not execute the release command if a target medium has not been picked up.

By determining if the gripper has picked up a target medium (such as disc) when a release command is received, this aspect of the invention avoids executing unnecessary drive operations such as executing a release command even though a target medium (such as disc) has not been picked up.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 is a table relating the starting and destination points that are set for controlling movement of the media transportation arm.

FIG. 11 is a table relating the starting and destination points that are set for controlling movement of the transportation arm according to a second embodiment of the invention.

DESCRIPTION OF THE PREFERRED EMBODIMENTS

Embodiment 1

A first embodiment of a media processing device according to the present invention is described below with reference to the accompanying figures.

Figure 1:
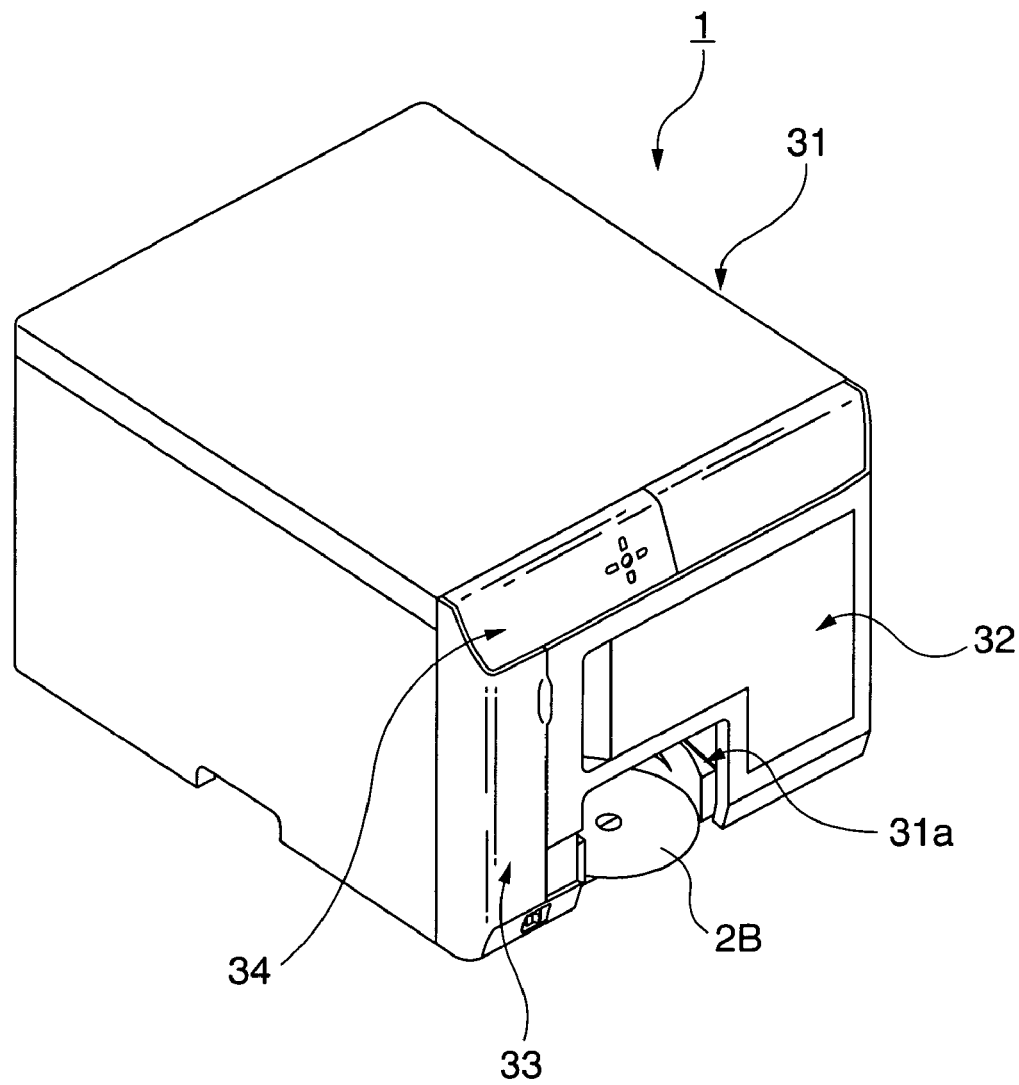
FIG. 1 is a schematic view of a publisher according to the present invention.
Figure 2:
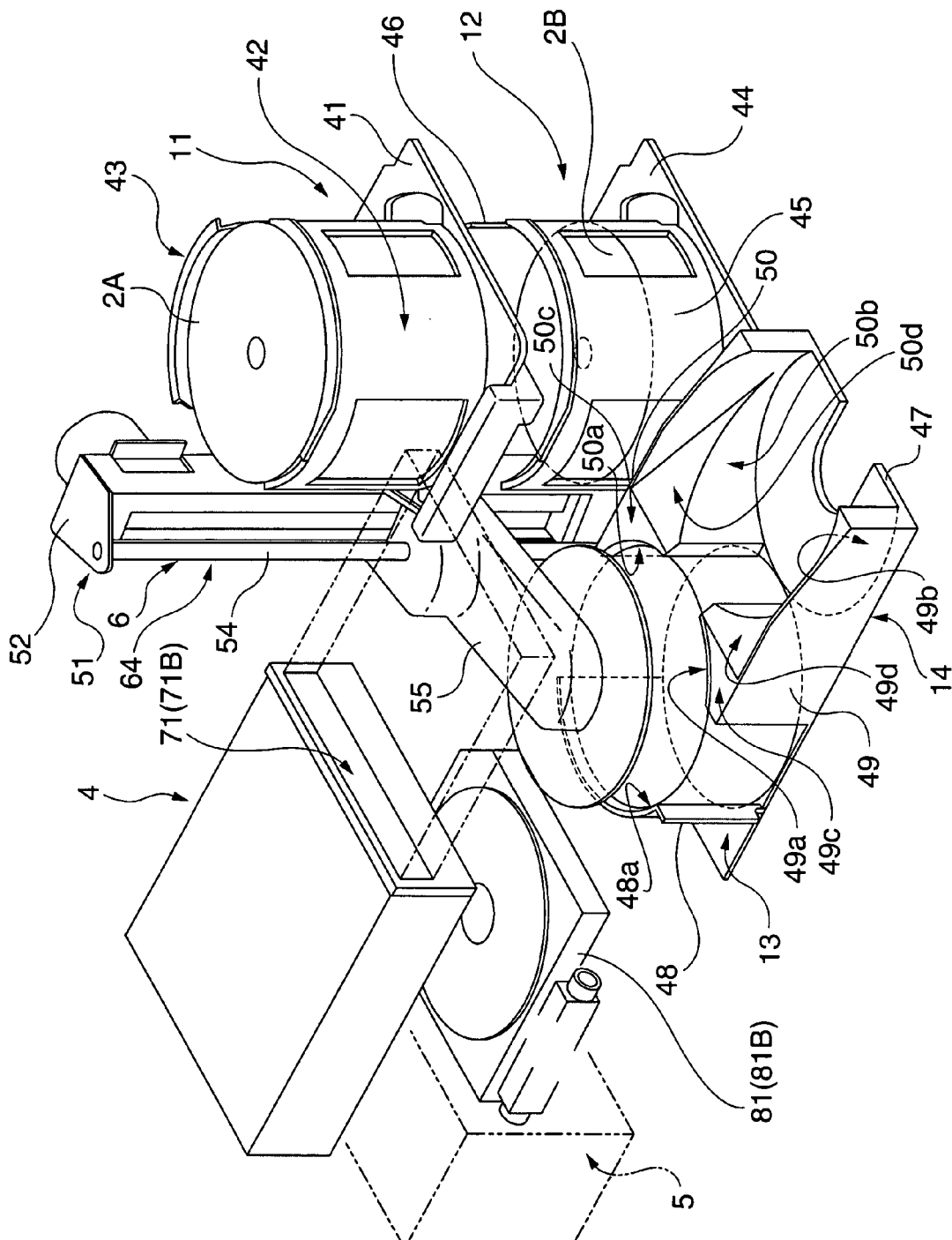
FIG. 2 is an oblique view showing the main internal parts of the publisher according to a preferred embodiment of the invention.
Figure 3:
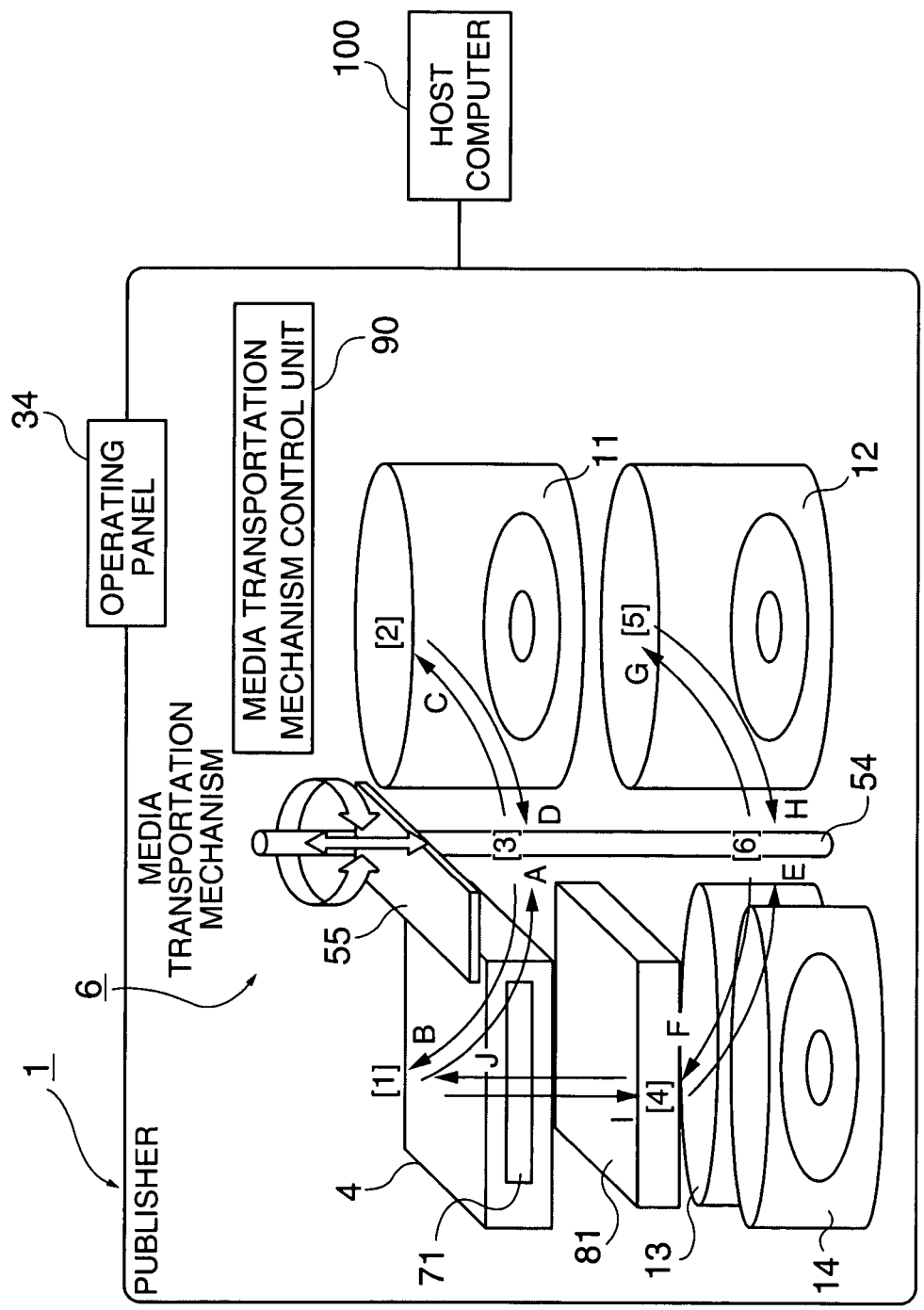
FIG. 3 is a schematic view showing the mechanical arrangement of the publisher according to a preferred embodiment of the invention.

FIG. 1 is an oblique external view of a CD publisher used to describe the invention, FIG. 2 is an oblique view showing the main internal parts of the CD publisher, and FIG. 3 is a schematic view showing the mechanical arrangement of the CD publisher.

Arrangement of the CD Publisher

As shown in FIG. 1, the CD publisher 1 (simply "publisher 1") below has a basically box-shaped equipment case 31 with doors 32 and 33 that can open and close to the right and left disposed at the front of the case 31. An operating panel 34 having indicators and operating buttons, for example, is disposed above the doors 32 and 33. A rectangular media exit 31a that is open to the outside for removing processed media is disposed below the one operable door 32 with the long side of the media exit 31a horizontal.

As shown in FIG. 2, blank media stacker 11 (media storage means) and a processed media stacker 12 (media storage means) are disposed coaxially one above the other inside the case 31 of the publisher 1 on the right side as seen from the front. The blank media stacker 11 stores blank media (also referred to as "discs" below) 2A that have not passed through the data writing process and label printing process. The processed media stacker 12 stores processed media after the data writing process and label printing process have been applied.

The blank media stacker 11 has a slide tray 41 that can be pulled horizontally out to the front, and a pair of left and right curved side walls 42 and 43 disposed vertically on top of the slide tray 41, thus rendering a stacker that receives discs 2A from the top opening and holds the discs 2A stacked coaxially. The task of storing or replenishing media 2A to be processed (referred to below as target media) in the blank media stacker 11 can be done easily by opening the operable door 32 and pulling the slide tray 41 out to the front.

The processed media stacker 12 below the blank media stacker 11 is identically constructed, and has a slide tray 44 that can be pulled horizontally out to the front, and a pair of left and right curved side walls 45 and 46 disposed vertically on top of the slide tray 44, thus rendering a stacker that receives discs 2A from the top opening and holds the discs 2 stacked coaxially.

The blank media stacker 11 and the processed media stacker 12 can each hold 50 (=n) discs 2A in this embodiment of the invention.

A general purpose stacker is disposed behind and to the left of the blank media stacker 11 and processed media stacker 12. The general purpose stacker 13 can be used to store media that is rejected because the data writing process failed, or to store processed discs 2B. A discharge media stacker 14 (media storage means) that is used for discharging the processed discs 2B to the outside is located in front of the general purpose stacker 13. These stackers 13 and 14 have a common base 47 and side walls 48, 49, and 50 rising vertically from the base 47.

The rear general purpose stacker 13 is composed of the curved inside circumference surface 48a of the rear side wall 48, and the curved inside circumference surfaces 49a and 50a on the back side of the left and right side walls 49 and 50, and stores the discs 2B received from the top opening rendered by these side walls stacked coaxially.

The front discharge media stacker 14 is composed of the curved inside circumference surfaces 49b and 50b on the front side of the left and right side walls 49 and 50, and stores the discs 2B received from the top opening rendered by these side walls stacked coaxially.

The top surfaces 49c and 50c of the left and right side walls 49 and 50 are substantially triangular flat surfaces, and sloped guide surfaces 49d and 50d that slope to the front are formed contiguously to the front edges of the top surfaces 49c and 50c. These sloped guide surfaces 49d and 50d continue to the top edge part of the left and right inside circumference surfaces 49b and 50b of the discharge media stacker 14.

In this embodiment of the invention, the general purpose stacker 13 can hold 30 (=n1) discs, and the discharge media stacker 14 can hold 20 (=n2) discs.

As shown in FIG. 2 and FIG. 3, a media transportation mechanism 6 is disposed behind the blank media stacker 11 and processed media stacker 12. The media transportation mechanism 6 includes a chassis 51 that is attached vertically to the case 31, a vertical guide shaft 54 that rises vertically between the top and bottom horizontal support plates 52 and 53 (see FIG. 4) of the chassis 51, and a media transportation arm 55 that is attached to the vertical guide shaft 54. The media transportation arm 55 can travel up and down on the vertical guide shaft 54, and can pivot right and left around the vertical guide shaft 54.

A media drive 4 is located at the top and a label printer 5 is located at the bottom behind the media transportation mechanism 6. In FIG. 2 the media tray 71 of the top media drive 4 is shown in the retracted position 71B inside the media drive 4, and the printer tray 81 of the bottom label printer 5 is shown in the rear media printing position 81B. The label printer 5 is an inkjet printer that uses ink cartridges (not shown in the figure) of various colors as the ink supply source, and the ink cartridges are installed to a cartridge housing (not shown in the figure).

The stackers 11 to 13 are located on the path of media transportation arm 55 movement. A gap enabling the media transportation arm 55 of the media transportation mechanism 6 to ascend and descend is formed between the left and right side walls 42 and 43 and the left and right side walls 45 and 46, respectively, of the blank media stacker 11 and processed media stacker 12. A gap is also formed vertically between the blank media stacker 11 and the processed media stacker 12 so that the media transportation arm 55 can pivot horizontally for positioning directly above the processed media stacker 12. The media transportation arm 55 can therefore be positioned to a location at a specified height inside the stackers 11 and 12.

The media transportation arm 55 can also be positioned at a specified height inside the general purpose stacker 13 by pivoting and moving the media transportation arm 55 to directly above the general purpose stacker 13, and then moving the media transportation arm 55 vertically at this position.

The position directly above the general purpose stacker 13 is the media transfer position of the printer tray 81, and the position directly above there is the media transfer position of the media tray 71. These media transfer positions are therefore also on the path of travel of the media transportation arm 55.

The discharge media stacker 14 is located in front of and beside the general purpose stacker 13, and is outside the pivot path of the media transportation arm 55. That is, the discharge media stacker 14 is in a position outside of the path of media transportation arm 55 movement. The processed discs 2B are stored in the discharge media stacker 14 in this embodiment of the invention as described below.

It is assumed that the processed disc 2B can be stopped so that is rests on the printer tray 81 and the top surfaces 49c and 50c on both sides. From this position the printer tray 81 advances from the media printing position 81A to the media transfer position. As a result, the processed disc 2B is pushed out by the printer tray 81, moves onto the top surfaces 49c and 50c in front, slides down the sloped guide surfaces 49d and 50d, and drops into the discharge media stacker 14. The processed discs 2B can thus dependably be stored in the discharge media stacker 14 as a result of the printer tray 81 pushing the processed discs 2B out.

Arrangement of the Media Transportation Mechanism

Figure 4:
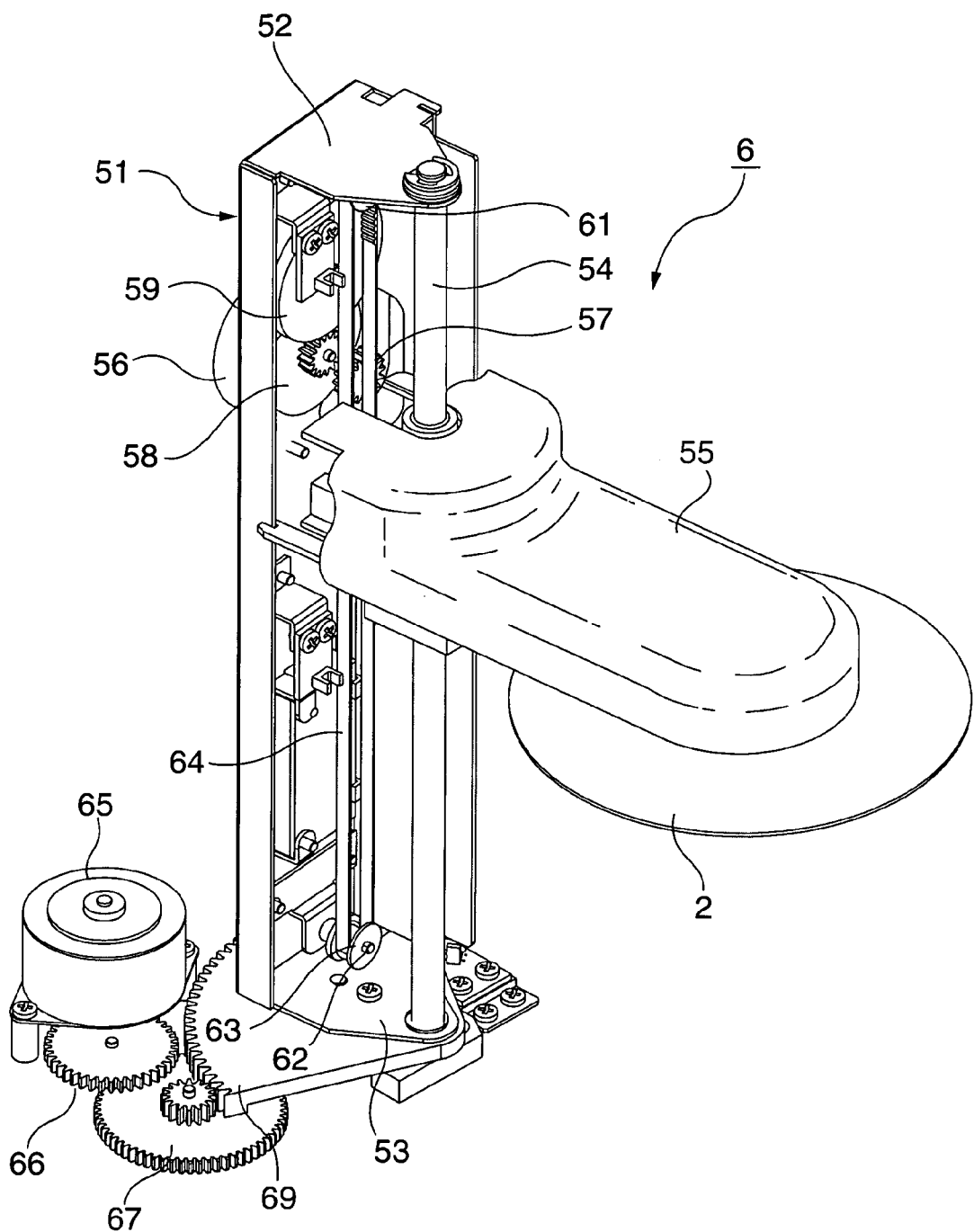
FIG. 4 is an oblique view showing a specific example of the arrangement of the media transportation mechanism in a preferred embodiment of the invention.

The mechanical arrangement of the media transportation mechanism is described next with reference to FIG. 4. FIG. 4 is an oblique view showing a specific example of the arrangement of the media transportation mechanism.

As described above the media transportation mechanism 6 has a chassis 51 that is attached perpendicularly to the case 31. The vertical guide shaft 54 is attached between the top and bottom horizontal support plates 52 and 53 of the chassis 51, and the media transportation arm 55 is supported so that it can travel up and down and pivot on the vertical guide shaft 54.

The elevator mechanism of the media transportation arm 55 has an elevator motor 56. Torque from the elevator motor 56 is transferred to a drive pulley 61 through an intervening speed reducing gear train including a pinion 57 that is attached to the output shaft of the motor, a compound transfer gear 58, and a transfer gear 59. The drive pulley 61 is supported freely rotatably on a horizontal rotary shaft (not shown in the figure) near the top end of the chassis 51.

A driven pulley 63 is supported freely rotatably on another horizontal rotary shaft (not shown in the figure) near the bottom end of the chassis 51. A timing belt 64 is mounted on the drive pulley 61 and driven pulley 63. The rear end part of the media transportation arm 55 is fixed to the timing belt 64 on either the left or right side. As a result, when the elevator motor 56 is driven, the timing belt 64 travels vertically in a loop, and the media transportation arm 55 attached to the timing belt 64 travels vertically on the vertical guide shaft 54.

The pivoting mechanism of the media transportation arm 55 has a pivot motor 65. A pinion (not shown in the figure) is mounted on the output shaft of the pivot motor 65. Rotation of the pinion is transferred to a fan-shaped final gear 69 through an intervening speed reducing gear train including two compound transfer gears 66 and 67. The final gear 69 can pivot right and left around the vertical guide shaft 54. The chassis 51 in which the components of the media transportation arm 55 elevator mechanism are assembled is mounted on the final gear 69. Driving the pivot motor 65 causes the final gear 69 to pivot right and left, and therefore also causes the chassis 51 that is mounted on the final gear 69 to pivot right and left around the vertical guide shaft 54. As a result, the media transportation arm 55 that is held by the elevator mechanism mounted on the chassis 51 also pivots right and left around the vertical guide shaft 54.

The media transportation arm 55 has, for example, three picking-up claws (picking means) in the center at the distal end, and one of the claws can move radially. The discs 2 can be picked-up (gripped) by inserting the claws into the center hole of the discs 2 and moving the one claw radially to the outside. By moving the one claw radially to the inside from this gripping position, the process discs 2 can be released and dropped from the picking-up claws.

Publisher Operation

The operation of the publisher 1 according to this embodiment of the invention is described next with reference to FIG. 3 and FIG. 5. FIG. 5 is a table relating the starting and destination points that are set for controlling movement of the media transportation arm.

The positions denoted [1] to [6] indicating the positions of distal end of the media transportation arm 55 in FIG. 3 correspond to positions [1] to [6] in FIG. 5. More specifically, [1] is the home position (standby position) of the media transportation arm 55, [2] is the position of the blank media stacker 11, [3] is any position between the home position and the blank media stacker 11, [4] is a midpoint, [5] is the position of the processed media stacker 12, and [6] is any position between the midpoint and the processed media stacker 12.

In addition, position [7] in FIG. 5 is any position between [1] and [4] in FIG. 3, or any position below [4]; position [8] in FIG. 5 is any position between [2] and [5] in FIG. 3, or any position below [5]. Position [9] in FIG. 5 is any position between [7] and [8].

The media transportation arm 55 normally moves along a preset path of travel. In this embodiment of the invention, the path of travel (movement) is the path from any position [1] to [6] to any position [1], [2], [4], and [5]. More specifically, the path of travel is the path indicated by arrow A to arrow J in FIG. 3, and position [9] is a position removed from this path of travel. More specifically, when the media transportation arm 55 is at position [9], the media transportation arm 55 may be unexpectedly stopped outside of the normal path of travel due, for example, to a problem that has occurred in the publisher 1. A media transportation arm 55 detector is disposed at positions [1], [2], [4], and [5] so that the position of the media transportation arm 55 can be detected. This embodiment of the invention calculates the distance to travel from the starting point [1], [2], [4], or [5] to the destination specified by the movement command, and moves the media transportation arm 55.

When the media transportation arm 55 is positioned at positions [3], [6], [7], [8], or [9], the media transportation arm 55 first moves to a position where one of the media transportation arm 55 detectors is located (any of positions [1], [2], [4], and [5]), the distance to travel is then calculated, and the arm moves to the destination.

As shown in FIG. 3, the publisher 1 is connected to communicate with a host computer 100, and the publisher 1 has a media transportation mechanism control unit 90 that controls driving of the media transportation mechanism 6. The media transportation mechanism control unit 90 controls moving of the media transportation arm 55 according to a media transportation arm 55 movement command sent from the host computer 100.

When the media transportation mechanism control unit 90 detects the media transportation arm 55 by one of the detectors, the media transportation mechanism control unit 90 stores the detected position, that is, position [1], [2], [4], or [5], as the starting point. In this case the media transportation mechanism control unit 90 functions as a position detection means and a storage means. The media transportation mechanism control unit 90 then calculates the distance of travel that the media transportation arm 55 must move from this starting point to the destination specified by the movement command sent from the host computer 100. Based on the calculated distance of travel, the media transportation mechanism control unit 90 drives the elevator motor 56 and the pivot motor 65 to move the media transportation arm 55.

In response to a media pick-up command sent from the host computer 100, the media transportation mechanism control unit 90 moves the picking-up claws disposed at the center of the distal end of the media transportation arm 55 to pick up a target disc 2. In response to a release command sent from the host computer 100, the media transportation mechanism control unit 90 also lowers the media transportation arm 55 at the destination, and operates the picking-up claws to release the target disc 2. When the target disc 2 is released, the media transportation arm 55 is then raised and stopped at the point where descent started.

This embodiment of the invention moves the media transportation arm 55 based on a movement command sent from the host computer 100, and then picks up or releases the target disc 2 at the destination based on a pick-up command or release command. Media transportation modes (operating modes) such as described below can therefore be set by combining plural media transportation arm movement commands and pick up and release commands to pick up and release the target disc 2 by the picking-up claws.

Normal Processing Mode (1) A blank disc 2A is picked up from the blank media stacker 11, carried to the media drive 4, and released.

(2) The media drive 4 writes data to the blank disc 2A, which becomes a target disc 2 (not shown).

(3) The target disc 2 is picked-up from the media drive 4, carried to the label printer 5, and released.

(4) The label printer 5 prints a label on the label side, which becomes the processed disc 2B.

(5) The processed disc 2B is picked up from the label printer 5, carried to the discharge media stacker 14, and released.

Continuous Processing Mode

Blank discs 2A are stored in the blank media stacker 11 and the processed media stacker 12 to the storage capacity of the stackers. If each stacker can hold 50 discs for a total storage capacity of 100 discs, the continuous processing mode is the processing mode for continuously producing a total 100 processed discs 2B.

(1) A blank disc 2A is picked up from the processed media stacker 12, carried to the media drive 4, and released.

(2) The media drive 4 writes data to the blank disc 2A, which becomes a target disc 2.

(3) The target disc 2 is picked up from the media drive 4, carried to the label printer 5, and released as a processed disc 2B.

(4) The target disc 2 is picked up from the label printer 5, carried to the general purpose stacker 13, and released.

(5) The sequence of steps (1) to (4) repeats continuously for the next 29 discs.

(6) A blank disc 2A is picked up from the processed media stacker 12 in which 20 discs remain, carried to the media drive 4, and released.

(7) After executing steps (2) and (3), the processed disc 2B is picked up from the label printer 5, carried to the media drive 4, and released.

(8) The sequence of steps (6) and (7) repeats continuously for the next 19 discs.

(9) A blank disc 2A is picked up from the blank media stacker 11, carried to the media drive 4, and released.

(10) After executing steps (2) and (3), the processed disc 2B is picked up from the label printer 5, carried to the processed media stacker 12, and released.

(11) The sequence of steps (9) and (10) repeats continuously for the next 49 discs.

The processed discs 2B are stored in the general purpose stacker 13, the discharge media stacker 14, and the processed media stacker 12 in the continuous processing mode. More specifically, the use of each stacker is not fixed, and the use can be changed according to the operating mode.

The media transportation modes described above are only examples, and other modes are also conceivable. In this embodiment of the invention, the media transportation arm 55 can carry the target discs 2 from any of the units including the media drive 4, the label printer 5, the blank media stacker 11, and the processed media stacker 12 units to any of the units including the media drive 4, the label printer 5, the processed media stacker 12, and the discharge media stacker 14. A plurality of media transportation routes can therefore be set, and the publisher 1 can be set to a variety of operating modes.

Figure 6:
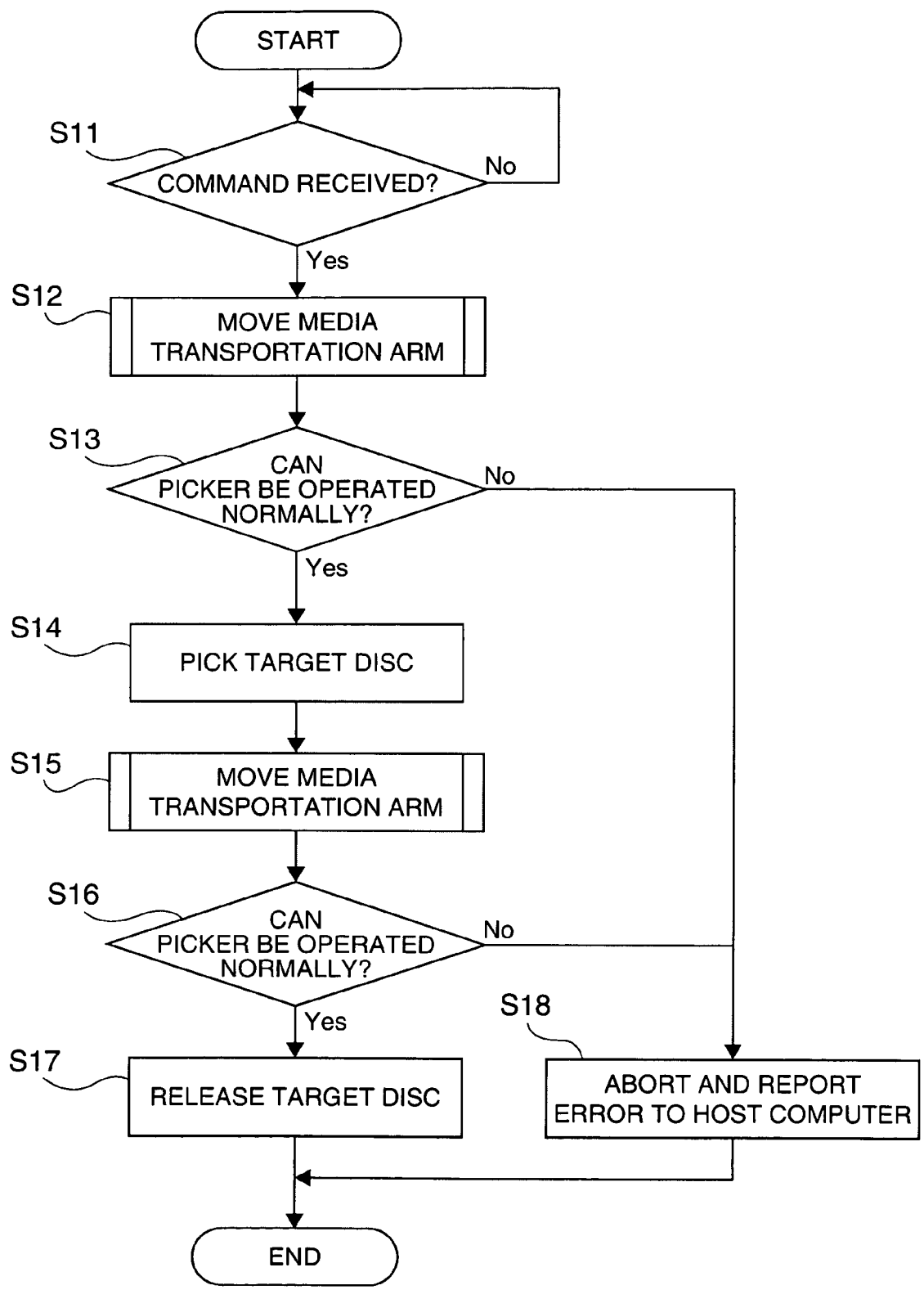
FIG. 6 is a flow chart describing the pick-up or release operations.

The target disc 2 pick up or release process executed in step (1) in the normal processing mode is described next with reference to the flow chart in FIG. 6. FIG. 6 is a flow chart describing the target disc 2 pick up or release operation.

When a command set including a movement command setting the location of the blank media stacker 11 as the destination, a target disc 2 pick-up command, a release command, and a movement command setting the location of the media drive 4 as the destination is received (step S11 returns Yes), the distal end of the media transportation arm 55 is moved according to the movement command to the position [2] of the blank media stacker 11 (step S12).

Figure 7:
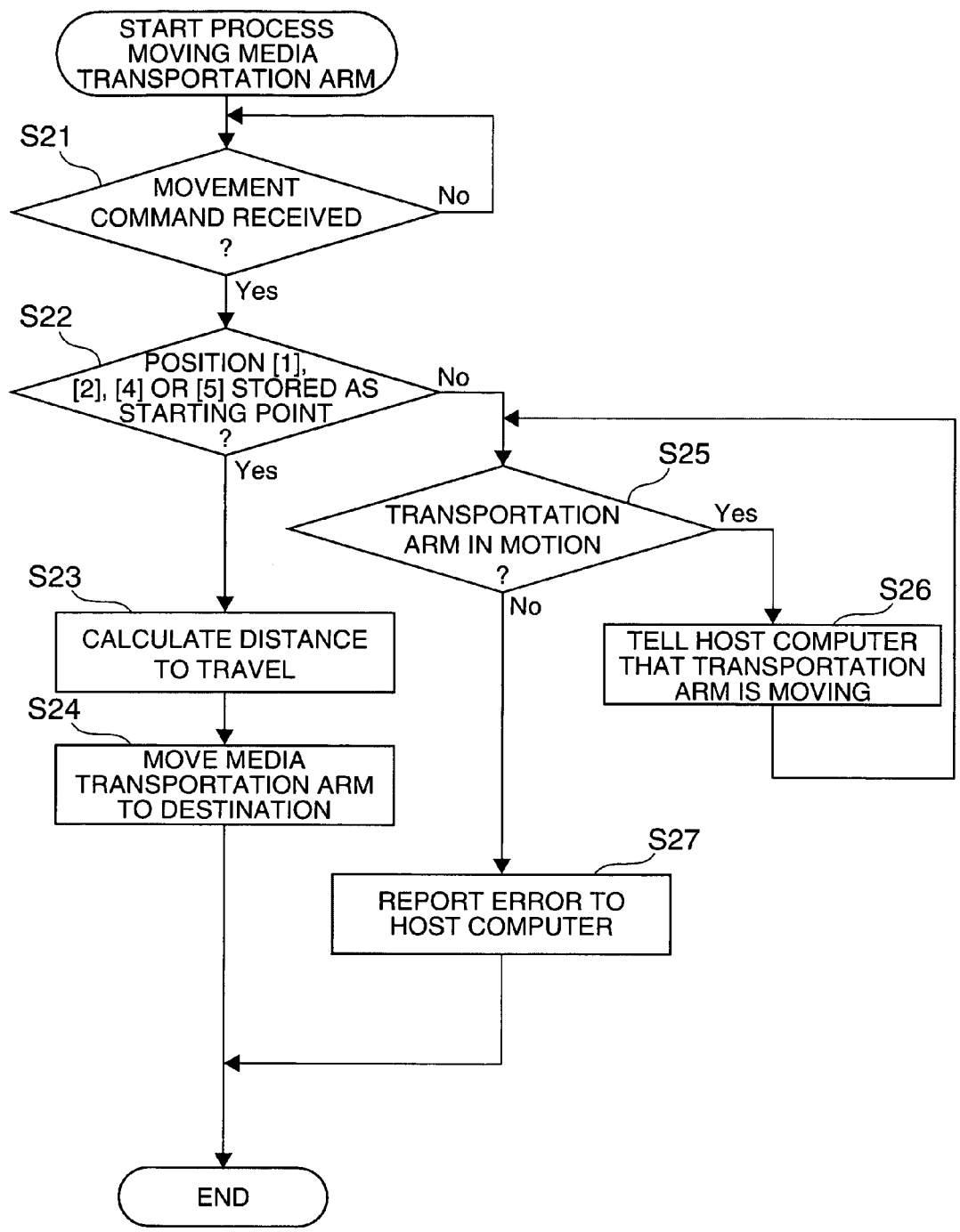
FIG. 7 is a flow chart describing the process for moving the media transportation arm.

The process of moving the media transportation arm 55 in step S12 of FIG. 6 is described with reference to the flow chart in FIG. 7.

When the media transportation mechanism control unit 90 receives a movement command for the media transportation arm 55 in the command set received in step S11 in FIG. 6 (step S21 returns Yes), the media transportation mechanism control unit 90 determines if the media transportation arm 55 is located at position [1], [2], [4] or [5] (step S22). More specifically, the media transportation mechanism control unit 90 determines which position [1], [2], [4] or [5] is held as the starting point of the media transportation arm 55.

If one of the positions [1], [2], [4] or [5] is held as the starting point (step S22 returns Yes), the media transportation mechanism control unit 90 calculates the distance to travel from the stored starting point to the destination specified by the received movement command (step S23), and then moves the media transportation arm 55 (step S24).

In this example the starting point of the media transportation arm 55 is at the home position (standby position) [1] and the media transportation arm 55 is moved according to the movement command setting the destination as the blank media stacker 11. If movement is completed normally, the media transportation mechanism control unit 90 stores position [2], the blank media stacker 11, as the next starting point. The path of travel in this case is from A->C in FIG. 3.

If the starting point stored by the media transportation mechanism control unit 90 is position [5] at the processed media stacker 12, and the received movement command specifies the position of the media drive 4 as the destination, the transportation arm moves to position [1], the home position (standby position) of the media transportation arm 55. The path of travel in this case is H->F->J in FIG. 3.

When the starting point stored by the media transportation mechanism control unit 90 is position [2], that is, the blank media stacker 11, and the received movement command specifies the position of the printer tray 81, the transportation arm also moves to position [1], the home position (standby position) of the media transportation arm 55. The path of travel in this case is D->B in FIG. 3.

If the starting point stored by the media transportation mechanism control unit 90 is position [1], the home position (standby position) of the media transportation arm 55, and the received movement command specifies the position of the processed media stacker 12 as the destination, the transportation arm moves to position [5], the location of the processed media stacker 12. The path of travel in this case is I->E->G in FIG. 3.

If in step S22 (see FIG. 7), position [1], [2], [4] or [5] is not stored as the starting point (step S22 returns No), whether the media transportation arm 55 is moving is determined. If the media transportation arm 55 is moving (step S25 returns Yes), the received movement command is not executed and the host computer 100 is informed that the media transportation arm 55 is in motion (step S26). If movement of the media transportation arm 55 has stopped, however, an error is returned to the host computer 100 (step S25 returns No, step S27).

If the media transportation arm 55 is not in motion in step S25 (step S25 returns No), the media transportation arm 55 is outside the normal path of travel. The movement command is therefore not executed and an error is returned to the host computer 100 indicating that a destination that cannot be reached from the current location was specified (step S27).

For example, the motor could go out of step and stop unexpectedly while the media transportation arm 55 is moving from position [1] to position [4] (the situation when the media transportation arm 55 is at position [7] after the motor stops), or the motor could go out of step, for example, and stop unexpectedly while picking up or releasing a disc at position [2] or position [5] (the situation when the media transportation arm 55 is at position [8] after the motor stops). If the media transportation arm 55 thus stops abnormally, the movement command is not executed and an error report is returned to the host computer 100.

Referring again to FIG. 6, the process of picking up or releasing a target disc is described next.

When the media transportation arm 55 moves to the blank media stacker 11 (step S12), the media transportation mechanism control unit 90 determines if the current position enables controlling claw operation normally. Except for the case in which a target disc 2 has already been picked up due to a command other than the pick-up command received in step S11, a condition in which claw operation can be controlled normally is any condition in which the media transportation arm 55 is positioned at a point where the target disc 2 can be picked up.

A condition in which the media transportation arm 55 is positioned at a point where a target disc 2 can be picked up is when the media transportation arm 55 is positioned at one of the points [1], [2], [4] or [5] where a media transportation arm 55 detector is located. This is because the location of the media transportation arm 55 is unknown if the media transportation arm 55 is positioned at any point other than [1], [2], [4] or [5], and must therefore be moved to a position where one of the detectors is located.

If the media transportation mechanism control unit 90 determines that the media transportation arm 55 is positioned where a target disc 2 can be picked up (step S13 returns Yes), because position [2] at the blank media stacker 11 is stored as the starting point, the claws are inserted to the center hole of the blank disc 2A and one claw is moved radially to the outside to pick up one blank disc 2A from the blank media stacker 11 (step S14).

If step S13 determines that a target disc 2 has already been picked up, or that the media transportation arm 55 is positioned at a point where a target disc 2 cannot be picked up, a pick-up process abort report is returned to the host computer 100 without picking up a blank disc 2A.

With a blank disc 2A picked up in step S14, the media transportation arm 55 is moved to the home position (standby position) at position [1] based on the movement command setting the position of the media drive 4 as the destination (step S15). The process of moving the media transportation arm 55 in this case is the same as described in step S12 with reference to the flow chart in FIG. 7. If movement of the media transportation arm 55 ends normally, the media transportation mechanism control unit 90 stores the home position (standby position) at position [1] as the starting point.

Next, the media transportation mechanism control unit 90 again determines if the current position enables driving and controlling the claws normally.

In step S16, the condition in which driving the claws can be controlled normally is when a target disc 2 has already been picked up and the media transportation arm 55 is positioned at a point where the picked-up target disc 2 can be released.

If the media transportation mechanism control unit 90 determines that the media transportation arm 55 is positioned at a point where the target disc 2 can be released (step S16 returns Yes) because a target disc 2 has been picked up and position [1], the home position (standby position), is stored as the starting point, the one claw is moved radially to the inside to release the blank disc 2A onto the media tray 71 of the media drive 4 (step S17).

However, if is determined in step S16 that a target disc 2 has not been picked up or the media transportation arm 55 is positioned at a point where the blank disc 2A cannot be released, a release process abort error is reported to the host computer 100 without releasing the disc (step S18).

Note that if the claws are driven in step S13 when a blank disc 2A has not been picked up, the picked-up blank disc 2A may be dropped. Furthermore, if the claws are driven to release the disc in step S16 when a blank disc 2A has not been picked up, the operation is simply wasted.

Furthermore, if the claws are driven in step S13 when the media transportation arm 55 is positioned at a point where a disc cannot be picked up, there could be a safety-related problem with the media processing device and damage could result.

In addition, if the claws are driven when the media transportation arm 55 is positioned to a point where a disc cannot be released, there could be a safety-related problem with the media processing device and damage could result.

This embodiment of the invention therefore enables not executing the pick up and release operations in cases such as described above, and executing the pick-up command and release command only when it is determined that driving the claws can be controlled normally. Operating errors can therefore be prevented.

Furthermore, because the host computer 100 is informed when the pick-up command or release command is not executed, the user can know that the pick-up command or release command did not execute correctly.

As described above, if the starting point of the media transportation arm 55 when a movement command is received from the host computer 100 is at any point not corresponding to position [1], [2], [4] or [5], that is, if the media transportation arm 55 is off the normal path of transportation arm travel, the media transportation mechanism control unit 90 in this embodiment of the invention does not execute the received movement command and returns an error report to the host computer 100. The host computer 100 can thus know that a problem with the publisher 1 has occurred. Issuing subsequent commands can therefore be blocked, the publisher 1 can be used safely, and the danger of damage occurring can be reduced.

Furthermore, if the starting point of the media transportation arm 55 when a movement command is received from the host computer 100 does not correspond to any of positions [1], [2], [4] and [5] and the media transportation arm 55 is moving, this embodiment of the invention reports to the host computer 100 that the movement command could not be executed. The danger of damage to the publisher 1 can therefore be reduced because issuing subsequent commands can be blocked and operating errors will not occur.

Embodiment 2

Figure 8:
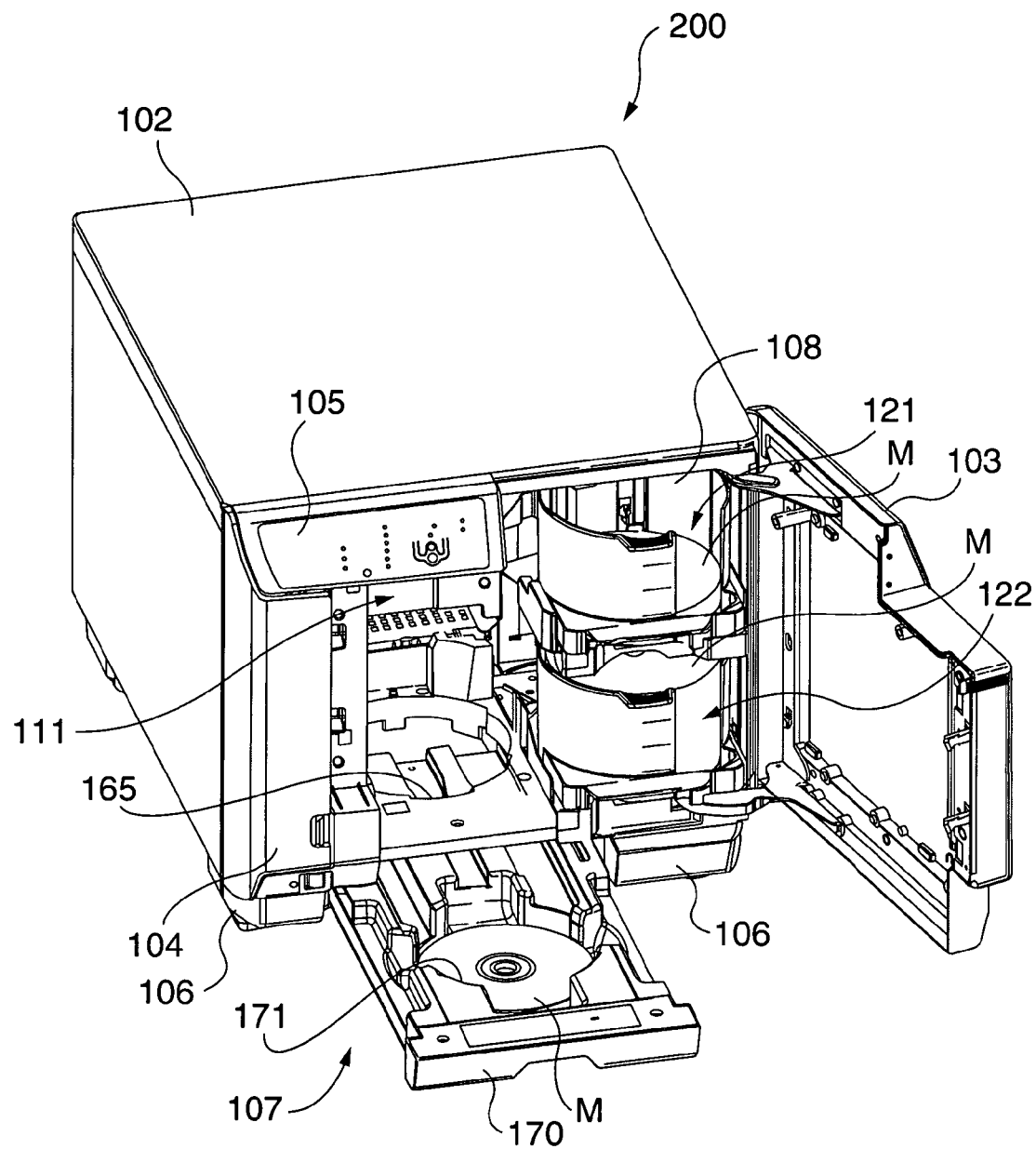
FIG. 8 is an oblique view showing the main internal parts of a publisher according to a second embodiment of the invention.
Figure 9:
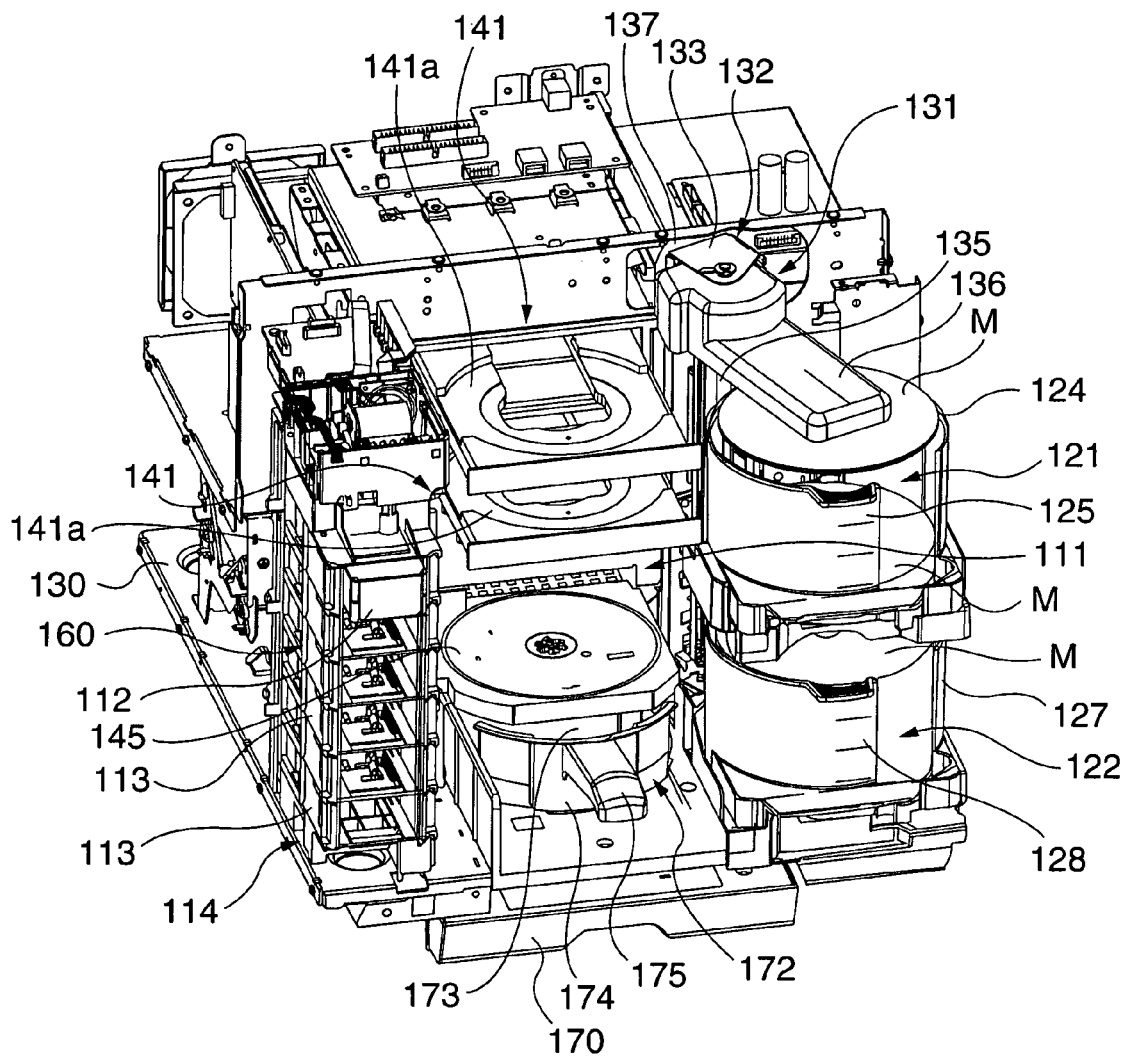
FIG. 9 is an oblique view of showing the major internal parts of the publisher according to a second embodiment of the invention.
Figure 10:
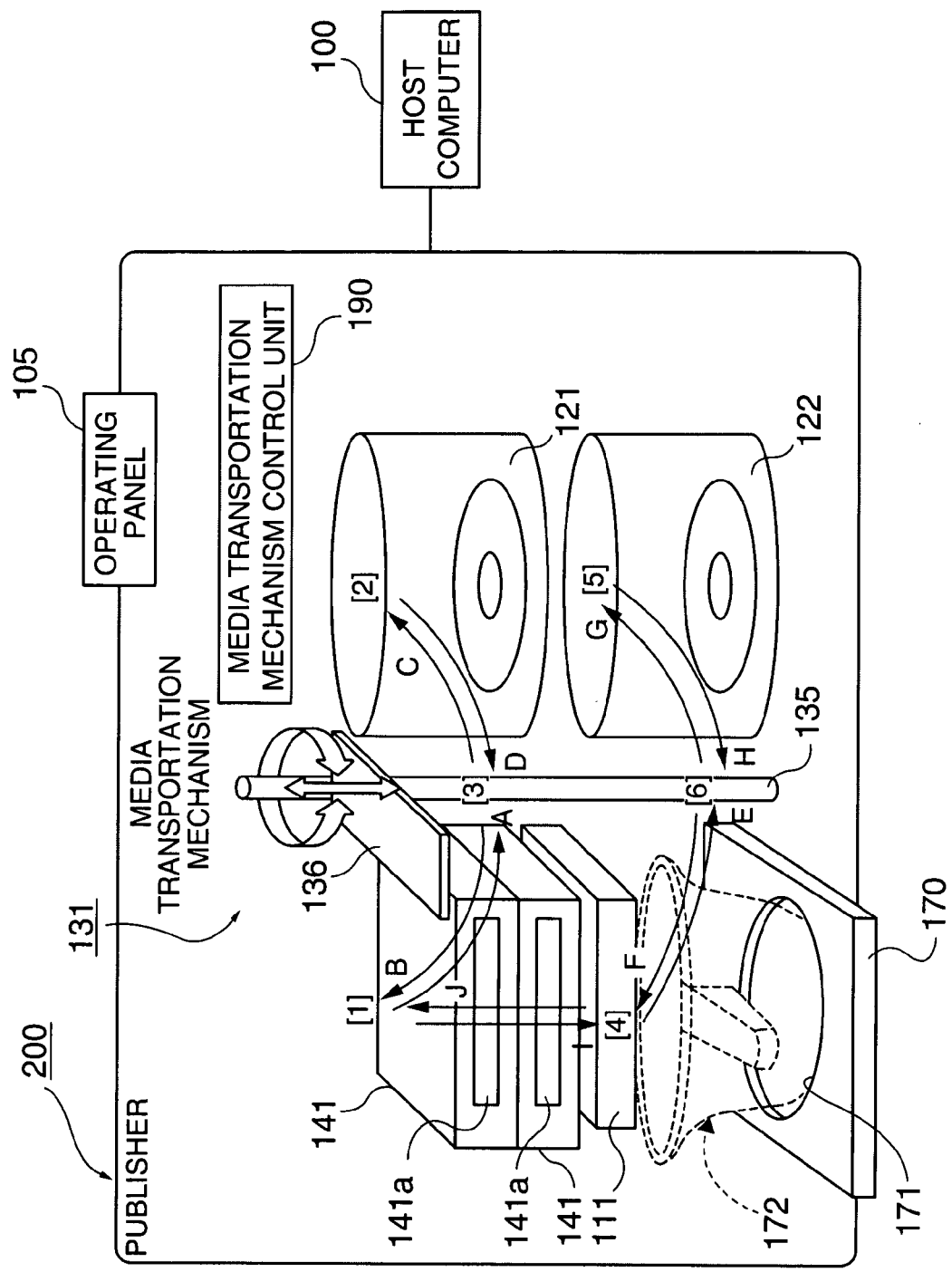
FIG. 10 is a schematic block diagram showing the mechanical arrangement of the publisher according to a second embodiment of the invention.

A second embodiment of a media processing device according to the present invention is described next with reference to the accompanying figures. FIG. 8 is an oblique view showing the appearance of a publisher according to this embodiment of the invention when the front doors are open, FIG. 9 is an oblique view of the major internal parts of the publisher, and FIG. 10 is a schematic block diagram showing the mechanical arrangement of the publisher.

Arrangement of the CD Publisher

As shown in FIG. 8, this publisher 200 is a media processing device for writing data to disc-shaped media such as CD and DVD media (referred to as simply "discs" below) and printing on the label side of the discs, and has a basically box-shaped case 102. Right and left doors 103 and 104 that can open and close are disposed at the front of the case 102. An operating panel 105 having indicators and operating buttons, for example, is disposed at the top left part of the case 102, and support legs 106 projecting downward are disposed on the left and right sides at the bottom of the case 102. A drawer mechanism 107 is disposed between the left and right legs 106.

The operable door 103 on the right side as seen from the front opens and closes the opening 108 at the front of the publisher 200 as shown in FIG. 8, and is used for opening and closing the opening 108 in order to load unused (blank) media M through the opening 108 or to remove finished media M through the opening 108.

The other operable door 104 on the left side as seen from the front is opened and closed to replace the ink cartridges 112 of the label printer 111 shown in FIG. 9. Opening the operable door 104 exposes the cartridge carrier 114, which has a plurality of cartridge holders 113 arranged vertically.

A first media stacker 121 (media storage means) and a second media stacker 122 (media storage means) are disposed one above the other inside the case 102 of the publisher 200 so that the centers of the media M are coaxially aligned. The first media stacker 121 stores a plurality (such as 50) of blank media M (also referred to as "discs" below) that have not passed through the data writing process. The second media stacker 122 stores a plurality (such as 50) of unused media M or processed media M. Both the first media stacker 121 and the second media stacker 122 can be freely installed to and removed from a respectively prescribed position.

The top first media stacker 121 has a pair of right and left curved side walls 124 and 125 disposed so that the media M can be received from the top opening and stored in a coaxial stack. Storing or replenishing media M in the first media stacker 121 can be done easily by opening the operable door 103 and pulling the first media stacker 121 out.

The bottom second media stacker 122 is constructed the same way having a pair of right and left curved side walls 127 and 128, rendering a stacker that can receive the media M from the top opening and store the media M in a coaxial stack.

A media transportation mechanism 131 is disposed behind the first media stacker 121 and the second media stacker 122. The media transportation mechanism 131 has a vertical guide shaft 135 that rises vertically between the main frame 130 and the top plate 133 of the chassis 132. A transportation arm 136 is supported so that it can move vertically and pivot on this vertical guide shaft 135. A drive motor 137 enables the transportation arm 136 to move vertically along the vertical guide shaft 135 and to pivot right and left around the vertical guide shaft 135.

Two media drives 141 are stacked vertically to the side of and behind the top and bottom stackers 121 and 122 and the media transportation mechanism 131, and the carriage (not shown in the figure) of the label printer 111 is disposed movably below these media drives 141.

Each of the media drives 141 has a media tray 141a that can move between a position for writing data to the media M and a media transfer position for loading and unloading the media M.

The label printer 111 has a media tray 145 that can move between a printing position for printing a label on the label side of the media M, and a media transfer position for loading and unloading the media M.

FIG. 9 shows the media trays 141a of the top and bottom media drives 141 pulled out to the media transfer position, and the media tray 145 of the label printer 111 below the media drives 141 in the forward media transfer position.

The label printer 111 is an inkjet printer that uses ink cartridges 112 as the ink supply mechanism 160. This embodiment of the invention uses ink cartridges 112 in six different colors (black, cyan, magenta, yellow, light cyan, and light magenta). The ink cartridges 112 are loaded from the front into the cartridge holders 113 of the cartridge carrier 114.

A gap enabling the media transportation arm 136 of the media transportation mechanism 131 to ascend and descend is formed between the left and right side walls 124 and 125 of the first media stacker 121, and between the left and right side walls 127 and 128 of the second media stacker 122. A gap is also formed between the top and bottom stacker 121 and second media stacker 122 so that the media transportation arm 136 of the media transportation mechanism 131 can pivot horizontally for positioning directly above the second media stacker 122. When both media trays 141a are retracted into the media drives 141, the transportation arm 136 of the media transportation mechanism 131 can descend to access the media tray 145 in the media transfer position.

When both media trays 141a are positioned in the data writing position and the media tray 145 is positioned in the inside printing position, the transportation arm 136 of the media transportation mechanism 131 can descend below the height of the media tray 145. A guide hole 165 is formed below the media transfer position of the media tray 145 so that media M released when the transportation arm 136 descends to this position pass through the guide hole 165 (see FIG. 8). Another media stacker (a separate stacker) described below is disposed at this guide hole 165.

As shown in FIG. 8, the drawer mechanism 107 has a sliding tray 170 that can be pulled out from the main frame 130 to an open position, loaded, and then closed again below the main frame 130. A stacker unit 171 rendered as an open recess is disposed in the sliding tray 170. When the sliding tray 170 is in the storage position (closed position), the stacker unit 171 is positioned below the guide hole 165, and the center of the stacker unit 171 is positioned coaxially to the media trays 141a and media tray 145 in the media transfer position. The stacker unit 171 receives media M deposited through the guide hole 165, and stores only a relatively small number (such as 5 to 10) of media M. The stacker unit 171 receives the media M from the top and stores the media M stacked coaxially.

A third media stacker 172 (a separate stacker) with a larger media M storage capacity than the stacker unit 171 can be installed to and removed from the guide hole 165 and the stacker unit 171 of the sliding tray 170 in the storage position.

This third media stacker 172 also has a pair of curved side walls 173 and 174, receives media M from the top opening between the walls, and can store a plurality of (such as 50) media M stacked coaxially. A gap enabling the media transportation arm 136 of the media transportation mechanism 131 to ascend and descend is formed between the left and right side walls 173 and 174. A handle 175 that is held by the user during installation and removal is disposed to a top part of one side wall 174.

When the third media stacker 172 is installed as shown in FIG. 9, the media M can be stored in the third media stacker 172 after blank media M are removed from the lower second media stacker 122 and recorded and printed by one of the media drives 141 and the label printer 111.

Furthermore, the first media stacker 121 on top and the second media stacker 122 on bottom can both be loaded with media M to the maximum storage capacity (50 discs+50 discs), all media M (50 discs) in the bottom second media stacker 122 can be sequentially processed and stored in the third media stacker 172, and then all media M (50 discs) in the top first media stacker 121 can be sequentially processed and stored in the emptied bottom second media stacker 122. Media M equal to the maximum storage capacity of the top first media stacker 121 and the bottom second media stacker 122 (50 discs+50 discs) can therefore be processed in one operation (batch processing mode).

In addition, when the third media stacker 172 is removed, blank media M can be taken from the top first media stacker 121 or the bottom second media stacker 122, data can be recorded and a label can be printed by the media drives 141 and label printer 111, and the processed media M can then be stored in the stacker unit 171 of the sliding tray 170 in the storage position.

Media M for which processing has been completed can thus be removed from the stacker unit 171 by pulling the sliding tray 170 out. More specifically, completed media M can be removed one or multiple discs at a time while the media M are processed and the operable door 103 remains closed (external discharge mode).

By combining the vertical travel and right and left pivoting actions of the transportation arm 136 of the media transportation mechanism 131, the media M can be desirably transported to the first media stacker 121, the second media stacker 122, the stacker unit 171 of the sliding tray 170 (or the third media stacker 172), the media tray 141a of each of the media drives 141, and the media tray 145 of the label printer 111.

Publisher Operation

The operation of the publisher 200 according to this embodiment of the invention is described next with reference to FIG. 10 and FIG. 11. FIG. 11 is a table relating the starting and destination points that are set for controlling movement of the media transportation arm.

The positions denoted [1] to [6] indicating the positions of distal end of the transportation arm 136 in FIG. 10 correspond to positions [1] to [6] in FIG. 11. More specifically, [1] is the home position (standby position) of the transportation arm 136, [2] is the position of the first media stacker 121, [3] is any position between the home position and the first media stacker 121, [4] is a midpoint, [5] is the position of the second media stacker 122, and [6] is any position between the midpoint and the second media stacker 122.

In addition, position [7] in FIG. 11 is any position between [1] and [4] in FIG. 10, or any position below [4]; position [8] in FIG. 11 is any position between [2] and [5] in FIG. 10, or any position below [5]. Position [9] in FIG. 11 is any position between [7] and [8].

The transportation arm 136 normally moves along a preset path of travel. In this embodiment of the invention the path of travel (movement) is the path from any position [1], [2], [4] or [5] to any position [1], [2], [4], and [5]. More specifically, the path of travel is the path indicated by arrow A to arrow J in FIG. 10, and position [9] is a position removed from this path of travel. More specifically, when the transportation arm 136 is at position [9], the transportation arm 136 may be unexpectedly stopped outside of the normal path of travel due, for example, to a problem that has occurred in the publisher 200. A transportation arm 136 detector is disposed at positions [1], [2], [4], and [5] so that the position of the transportation arm 136 can be detected. This embodiment of the invention calculates the distance to travel from the starting point [1], [2], [4], or [5] to the destination specified by the movement command, and moves the transportation arm 136.

When the transportation arm 136 is positioned at positions [3], [6], [7], [8], or [9], the transportation arm 136 first moves to a position where one of the transportation arm 136 detectors is located (any of positions [1], [2], [4], and [5]), the distance to travel is then calculated, and the arm moves to the destination.

As shown in FIG. 10, the publisher 200 is connected to communicate with a host computer 100, and the publisher 200 has a media transportation mechanism control unit 190 that controls driving the media transportation mechanism 131. The media transportation mechanism control unit 190 controls movement of the transportation arm 136 according to a transportation arm 136 movement command sent from the host computer 100.

When the media transportation mechanism control unit 190 detects the transportation arm 136 through one of the detectors, the media transportation mechanism control unit 190 stores the detected position, that is, position [1], [2], [4], or [5], as the starting point. In this case the media transportation mechanism control unit 190 functions as a position detection means and a storage means. The media transportation mechanism control unit 190 then calculates the distance of travel that the transportation arm 136 must move from this starting point to the destination specified by the movement command sent from the host computer 100. Based on the calculated distance of travel, the media transportation mechanism control unit 190 drives the elevator motor and the pivot motor to move the transportation arm 136.

In response to a media pick-up command sent from the host computer 100, the media transportation mechanism control unit 190 moves the picking-up claws disposed at the center of the distal end of the transportation arm 136 to pick up media M. In response to a release command sent from the host computer 100, the media transportation mechanism control unit 190 also lowers the transportation arm 136 at the destination, and operates the picking-up claws to release the media M. When the media M is released, the transportation arm 136 is then raised and stopped at the point where descent started.

This embodiment of the invention moves the transportation arm 136 based on a movement command sent from the host computer 100, and then picks up or releases media M at the destination based on a pick-up command or release command. The media transportation modes (operating modes) described above can therefore be set by combining plural movement commands for the transportation arm 136 and pick-up and release commands for picking up and releasing media M by the picking-up claws. Some media transportation modes are described below.

External Discharge Mode

As described above, the external discharge mode is used when the third media stacker 172 is removed.

(1) Blank media M is picked up from the first media stacker 121 or second media stacker 122), carried to one of the media drives 141, and released.

(2) The media drive 141 then writes data to the blank media M.

(3) The media M is then picked up from the media drive 141, carried to the label printer 111, and released.

(4) The label printer 111 then prints a label on the label side of the media M.

(5) The media M is then picked up from the label printer 111, carried to the sliding tray 170, and released.

Batch Processing Mode

As described above, the batch processing mode is used when the third media stacker 172 is installed.

The first media stacker 121 and the second media stacker 122 are loaded with blank media M to the maximum storage capacity. This is a processing mode for continuously producing 100 media M if 50 discs are loaded into each of the first and second stackers.

(1) Blank media M is picked up from the second media stacker 122, carried to a media drive 141, and released.
(2) The media drive 141 then writes data to the blank media M.
(3) The media M is then picked up from the media drive 141, carried to the label printer 111, and released.
(4) The media M is then picked up from the label printer 111, carried to the third media stacker 172, and released.
(5) The sequence of steps (1) to (4) then repeats 49 times.
(6) Blank media M is picked up from the first media stacker 121, carried to a media drive 141, and released.
(7) Steps (2) and (3) execute, and the media M is then picked up from the label printer 111, carried to the second media stacker 122 and released.
(8) The sequence of steps (6) and (7) then repeats 49 times.

At the end of the batch processing mode the processed media M are stored in the third media stacker 172 and the second media stacker 122. More specifically, the use of each stacker is not fixed, and the use can be changed according to the operating mode.

The media transportation modes described above are only examples, and other modes are also conceivable. In this embodiment of the invention the transportation arm 136 can carry media M from any of the units including media drives 141, the label printer 111, the first media stacker 121, and the second media stacker 122 to any of the units including the media drives 141, the label printer 111, the sliding tray 170, the first media stacker 121, the second media stacker 122, and the third media stacker 172. A plurality of media transportation routes can therefore be set, and the publisher 200 can be set to a variety of operating modes.

The media M pick up or release process executed in step (1) in the external discharge mode is described next with reference to the flow chart in FIG. 6.

When a command set including a movement command setting the location of the first media stacker 121 as the destination, a media M pick-up command, a release command, and a movement command setting the location of a media drive 141 as the destination is received (step S11 returns Yes), the distal end of the transportation arm 136 is moved according to the movement command to the position [2] of the first media stacker 121 (step S12).

The process of moving the transportation arm 136 in step S12 is described with reference to the flow chart in FIG. 7. FIG. 7 is a flow chart describing the transportation arm movement process shown in step S12 in FIG. 6.

When the media transportation mechanism control unit 190 receives a movement command for the transportation arm 136 in the command set received in step S11 in FIG. 6 (step S21 returns Yes), the media transportation mechanism control unit 190 determines if the transportation arm 136 is located at position [1], [2], [4] or [5] (step S22). More specifically, the media transportation mechanism control unit 190 determines which position [1], [2], [4] or [5] is held as the starting point of the transportation arm 136.

If one of the positions [1], [2], [4] or [5] is held as the starting point (step S22 returns Yes), the media transportation mechanism control unit 190 calculates the distance to travel from the stored starting point to the destination specified by the received movement command (step S23), and then moves the transportation arm 136 (step S24).

In this example the starting point of the transportation arm 136 is at the home position (standby position) [1] and the transportation arm 136 is moved according to the movement command setting the destination as the first media stacker 121. If movement is completed normally (without any problems), the media transportation mechanism control unit 190 stores position [2], the first media stacker 121, as the next starting point. The path of travel in this case is from A->C in FIG. 10.

If the starting point stored by the media transportation mechanism control unit 190 is position [5] at the second media stacker 122, and the received movement command specifies the position of the media drive 141 as the destination, the transportation arm moves to position [1], the home position (standby position) of the transportation arm 136. The path of travel in this case is H->F->J in FIG. 10.

When the starting point stored by the media transportation mechanism control unit 190 is position [2], that is, the position of the first media stacker 121, and the received movement command specifies the position of the label printer 111, the transportation arm also moves to position [1], the home position (standby position) of the transportation arm 136. The path of travel in this case is D->B in FIG. 10.

If the starting point stored by the media transportation mechanism control unit 190 is position [1], the home position (standby position) of the transportation arm 136, and the received movement command specifies the position of the second media stacker 122 as the destination, the transportation arm moves to position [5], the location of the second media stacker 122. The path of travel in this case is I->E->G in FIG. 10.

If in step S22 position [1], [2], [4] or [5] is not stored as the starting point (step S22 returns No), whether the transportation arm 136 is moving is determined. If the transportation arm 136 is moving (step S25 returns Yes), the received movement command is not executed and the host computer 100 is informed that the transportation arm 136 is in motion (step S26). If movement of the transportation arm 136 has stopped, however, an error is returned to the host computer 100 (step S25 returns No, step S27).

If the transportation arm 136 is not in motion in step S25 (step S25 returns No), the media transportation arm 55 is outside the normal path of travel. The movement command is therefore not executed and an error is returned to the host computer 100 indicating that a destination that cannot be reached from the current location was specified (step S27).

For example, the motor could go out of step and stop unexpectedly while the transportation arm 136 is moving from position [1] to position [4] (the situation when the transportation arm 136 is at position [7] after the motor stops), or the motor could go out of step, for example, and stop unexpectedly while picking up or releasing media M at position [2] or position [5] (the situation when the transportation arm 136 is at position [8] after the motor stops). If the transportation arm 136 thus stops abnormally, the movement command is not executed and an error report is returned to the host computer 100.

Referring again to FIG. 6, the process of picking up or releasing media M is described next.

When the transportation arm 136 moves to the first media stacker 121 (step S12), the media transportation mechanism control unit 190 determines if the current position enables controlling claw operation normally. Except for the case in which media M has already been picked up due to a command other than the pick-up command received in step S11, a condition in which claw operation can be controlled normally is any condition in which the transportation arm 136 is positioned at a point where media M can be picked up.

A condition in which the transportation arm 136 is positioned at a point where media M can be picked up is when the transportation arm 136 is positioned at one of the points [1], [2], [4] or [5] where a transportation arm 136 detector is located. This is because the location of the transportation arm 136 is unknown if the transportation arm 136 is positioned at any point other [1], [2], [4] or [5], and must therefore be moved to a position where one of the detectors is located.

If the media transportation mechanism control unit 190 determines that the transportation arm 136 is positioned where media M can be picked up (step S13 returns Yes), because position [2] at the first media stacker 121 is stored as the starting point, the claws are inserted to the center hole of the media M and one claw is moved radially to the outside to pick up one disc M from the first media stacker 121 (step S14).

If step S13 determines that a disc M has already been picked up, or that the transportation arm 136 is positioned at a point where media M cannot be picked up, a pick up process abort report is returned to the host computer 100 without picking up the media M.

With a disc M picked up in step S14, the transportation arm 136 is moved to the home position (standby position) at position [1] based on the movement command setting the position of the media drive 141 as the destination (step S15). The process of moving the transportation arm 136 in this case is the same as described in step S12 with reference to the flow chart in FIG. 7. If moving the transportation arm 136 ends normally, the media transportation mechanism control unit 190 stores the home position (standby position) at position [1] as the starting point.

Next, the media transportation mechanism control unit 90 again determines if the current position enables driving and controlling the claws normally.

In step S16 the condition in which driving the claws can be controlled normally is when media M has already been picked up and the transportation arm 136 is positioned at a point where the picked-up media M can be released.

If the media transportation mechanism control unit 190 determines that the transportation arm 136 is positioned at a point where the media M can be released (step S16 returns Yes) because a disc M has been picked up and position [1], the home position (standby position), is stored as the starting point, the one claw is moved radially to the inside to release the media M onto the media tray 141a of the media drive 141 (step S17).

However, if is determined in step S16 that media M has not been picked up or the transportation arm 136 is positioned at a point where the media M cannot be released, a release process abort error is reported to the host computer 100 without releasing the disc (step S18).

Note that if the claws are driven in step S13 when media M has not been picked up, the picked-up media M may be dropped. Furthermore, if the claws are driven to release the disc in step S16 when media M has not been picked up, the operation is simply wasted.

Furthermore, if the claws are driven in step S13 when the transportation arm 136 is positioned at a point where a disc cannot be picked up, there could be a safety-related problem with the media processing device and damage could result.

In addition, if the claws are driven when the transportation arm 136 is positioned to a point where a disc cannot be released, there could be a safety-related problem with the media processing device and damage could result.

This embodiment of the invention therefore enables not executing the pick-up and release operations in cases such as described above, and executing the pick-up command and release command only when it is determined that driving the claws can be controlled normally. Operating errors can therefore be prevented.

Furthermore, because the host computer 100 is informed when the pick-up command or release command is not executed, the user can know that the pick-up command or release command did not execute correctly.

As described above, if the starting point of the transportation arm 136 when a movement command is received from the host computer 100 is at any point not corresponding to position [1], [2], [4] or [5], that is, if the transportation arm 136 is off the normal path of transportation arm travel, the media transportation mechanism control unit 190 in this embodiment of the invention does not execute the received movement command and returns an error report to the host computer 100. The host computer 100 can thus know that a problem with the publisher 200 has occurred. Issuing subsequent commands can therefore be blocked, the publisher 200 can be used safely, and the danger of damage occurring can be reduced.

Furthermore, if the starting point of the transportation arm 136 when a movement command is received from the host computer 100 does not correspond to any of positions [1], [2], [4] and [5] and the transportation arm 136 is moving, this embodiment of the invention reports to the host computer 100 that the movement command could not be executed. The danger of damage to the publisher 200 can therefore be reduced because issuing subsequent commands can be blocked and operating errors will not occur.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media processing device comprising:
a data writing means that applies a data writing process to one side of a target medium;
a printing means that applies a printing process to the other side of the target medium;
a media storage means that stores the target medium;
a transportation means that transports the target medium to any one of the data writing means, the printing means, and the media storage means according to a command received from a host computer;
a position detection means that detects the position of the transportation means; and
a storage means that stores the position where the position detection means detected the transportation means as a starting point;
wherein the transportation means reports an error to the host computer when the target medium cannot be transported according to the command from the host computer, and if the position detection means detects that the transportation means is not in motion;
wherein the transportation means does not execute the received command if the starting point is not stored in the storage means when the command is received from the host computer, and if the position detection means detects that the transportation means is in motion.

2. The media processing device described in claim 1, wherein the transportation means does not execute the received command if the transportation means is positioned at a point outside the path of travel when the command is received from the host computer.

3. The media processing device described in claim 1, wherein:
the transportation means comprises a gripping means for picking up the target medium or releasing a picked-up target medium; and
the transportation means determines if driving the gripping means can be normally controlled when a pick up command or a release command is received from the host computer, and reports an error to the host computer without executing the pick up command or the release command if normal drive control is determined not possible.

4. The media processing device described in claim 3, wherein the transportation means determines if the gripping means has picked up a target medium when a pick-up command is received, and does not execute the pick-up command if a target medium has already been picked up.

5. The media processing device described in claim 4, wherein the transportation means determines if the gripping means has picked up a target medium when a release command is received, and does not execute the release command if a target medium has not been picked up.

6. The media processing device described in claim 1, wherein the transportation means calculates a distance between the stored starting point and a destination point specified by the command, and
wherein the transportation means transports the target medium the distance to the destination point.

7. A media processing device comprising:
a data writer that applies a data writing process to one side of a target medium;
a printer that applies a printing process to the other side of the target medium;
a media stacker that stores the target medium;
a transportation device that transports the target medium to any one of the data writer, the printer, and the media stacker according to a command received from a host computer;
a position detector that detects the position of the transportation device; and
a memory that stores the position where the position detector detected the transportation device as a starting point;
wherein the transportation device reports an error to the host computer when the target medium cannot be transported according to the command from the host computer, and if the position detector detects that the transportation device is not in motion; and
wherein the transportation device does not execute the received command if the starting point is not stored in the memory when the command is received from the host computer, and if the position detector detects that the transportation device is in motion.

8. The media processing device described in claim 7, wherein the transportation device does not execute the received command if the transportation device is positioned at a point outside the path of travel when the command is received from the host computer.

9. The media processing device described in claim 7, wherein:
the transportation device comprises a gripper for picking up the target medium or releasing a picked-up target medium; and
the transportation device determines if driving the gripper can be normally controlled when a pick up command or a release command is received from the host computer, and reports an error to the host computer without executing the pick up command or the release command if normal drive control is determined not possible.

10. The media processing device described in claim 9, wherein the transportation device determines if the gripper has picked up a target medium when a pick-up command is received, and does not execute the pick-up command if a target medium has already been picked up.

11. The media processing device described in claim 10, wherein the transportation device determines if the gripper has picked up a target medium when a release command is received, and does not execute the release command if a target medium has not been picked up.

12. The media processing device described in claim 7, wherein the transportation device calculates a distance between the stored position and a destination point specified by the command, and
wherein the transportation device transports the target medium the distance to the destination point.

13. A control method for a media processing device that has a data writer that applies a data writing process to one side of a target medium;
a printer that applies a printing process to the other side of the target medium;
a media stacker that stores the target medium; and
a transportation device that transports the target medium to any one of the data writer, the printer, and the media stacker according to a command received from a host computer;
wherein control method comprises a step of reporting an error to the host computer when the transportation device is not in notion and the target medium cannot be transported according to the command from the host computer; and
wherein if a position detected by a position detector that detects the position of the transportation device is not stored as a starting point by a memory when a command is received from the host computer, and if the position detector detects the transportation device is in motion, the received command is not executed.

14. The control method for a media processing device described in claim 13, wherein if the transportation device is positioned at a point outside the path of travel when a command is received from the host computer, the received command is not executed.

15. The control method for a media processing device described in claim 13, wherein the transportation device comprises a gripper for picking up the target medium or releasing a picked-up target medium; and
the control method determines if driving the gripper can be normally controlled when a pick up command or a release command is received from the host computer, and reports an error to the host computer without executing the pick-up command or the release command if normal drive control is determined not possible.

16. The control method for a media processing device described in claim 15, wherein the control method determines if the gripper has picked up a target medium when a pick-up command is received, and does not execute the pick-up command if a target medium has already been picked up.

17. The control method for a media processing device described in claim 16, wherein the control method determines if the gripper has picked up a target medium when a release command is received, and does not execute the release command if a target medium has not been picked up.

18. The control method for a media processing device described in claim 13, wherein the control method calculates a distance between the stored position and a destination point specified by the command, and wherein the transportation device transports the target medium the distance to the destination point.

* * * * *